No. 891,935. PATENTED JUNE 30, 1908.
T. W. JERREMS.
GRASS TWINE.
APPLICATION FILED SEPT. 21, 1905.
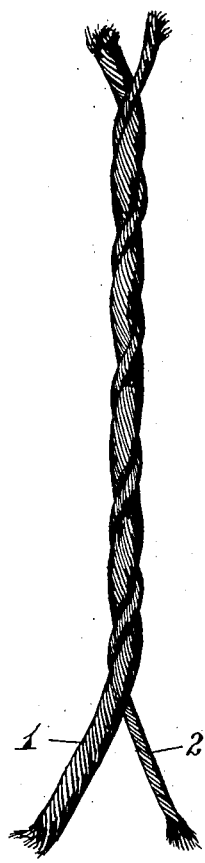
Witnesses.
E. W. Jeppesen.
A. H. Opsahl.
Inventor.
Thomas W. Jerrems.
By his Attorneys.
Williamson Merchant

UNITED STATES PATENT OFFICE.

THOMAS W. JERREMS, OF ST. PAUL, MINNESOTA.

GRASS TWINE.

No. 891,935.

Specification of Letters Patent.

Patented June 30, 1908.

Application filed September 21, 1905. Serial No. 279,487.

*To all whom it may concern:*

Be it known that I, THOMAS W. JERREMS, a citizen of the United States, residing at St. Paul, in the county of Ramsey and State of Minnesota, have invented certain new and useful Improvements in Grass Twine; and I do hereby declare the following to be a full, clear, and exact description of the invention, such as will enable others skilled in the art to which it appertains to make and use the same.

My invention has for its especial object to provide an extremely cheap and efficient binding twine adapted for use in connection with twine binders of standard construction. Binding twine of this character should not be over one-eighth of an inch in diameter, in order that it may be used in standard twine binders, and at the same time it must have a very considerable tensile strength. Such materials as flax, manila and sisal, make a strong binding twine, but such materials are expensive, and furthermore, it has been found in practice that insects will eat such materials, thus frequently cutting the bands of bundles placed in shocks or stacks.

Marsh grass is comparatively cheap, and it has been found that insects will not eat this grass. Marsh grass, however, has not as great tensile strength as the other materials noted, and hence, for binding twine it is desirable to reinforce the grass with a relatively small twisted strand of fiber of relatively high tensile strength. My improved twine is, therefore, made up of two strands, the one of which is formed of marsh grass and is relatively large and the other of which is made up of flax, manila, sisal, or similar comparatively strong material and is relatively small. These two strands are independently twisted and are then twisted together so that each strand is given spiral form.

The improved twine is illustrated in the single view of drawing, wherein the numeral 1 indicates a relatively large twisted strand of marsh grass and the numeral 2 indicates the relatively small twisted strand of manila, flax or sisal. The two strands are twisted in the same direction, before they are brought together, and after they are brought together are twisted together by further rotation in the same direction. A twine thus constructed will have no tendency to untwist or to kink. The large strand 1 of marsh grass should have fully twice the diameter of the small strand 2. In practice, it has been found that a twine thus constructed will have a very great tensile strength and can be produced at a cost very greatly less than that of the standard binding twine constructed of flax, manila, or sisal. In short, this improved binding twine has all of the good qualities of the so-called standard twine and when applied to the bundles will not be severed by insects, because the main strand of marsh grass will hold the bundle together, even though the small strand should be severed.

What I claim and desire to secure by Letters Patent of the United States, is as follows:

A twine made up of two strands 1 and 2, the said strand 1 being relatively large and constructed of marsh grass and the said twine 2 being relatively small and constructed of relatively strong fibrous material, the said two strands being independently twisted in the same direction and being twisted together to form the complete twine, both of the said strands having spiral form and each strand comprising a multiplicity of stems, substantially as described.

In testimony whereof I affix my signature in presence of two witnesses.

THOMAS W. JERREMS.

Witnesses:
MALIE HOEL,
F. D. MERCHANT.